(12) United States Patent
Fereyre et al.

(10) Patent No.: US 8,692,175 B2
(45) Date of Patent: Apr. 8, 2014

(54) IMAGE SENSOR WITH VERY HIGH DYNAMIC RANGE

(75) Inventors: Pierre Fereyre, Voreppe (FR); Frederic Mayer, Voiron (FR)

(73) Assignee: E2V Semiconductors, Saint-Égrève (FR)

( * ) Notice: Subject to any disclaimer, the term of this patent is extended or adjusted under 35 U.S.C. 154(b) by 187 days.

(21) Appl. No.: 13/427,846

(22) Filed: Mar. 22, 2012

(65) Prior Publication Data

US 2012/0241595 A1    Sep. 27, 2012

(30) Foreign Application Priority Data

Mar. 23, 2011    (FR) ...................................... 11 52414

(51) Int. Cl.
*H01J 43/04*    (2006.01)
(52) U.S. Cl.
USPC ......................................................... 250/207
(58) Field of Classification Search
USPC ....................... 250/208.1, 207; 257/290–292, 257/431–433; 348/294–299
See application file for complete search history.

(56) References Cited

U.S. PATENT DOCUMENTS

| 7,667,176 B2 * | 2/2010 | Olsen et al. ................. 250/208.1 |
| 2008/0048212 A1 | 2/2008 | Nakashima et al. |
| 2008/0179490 A1 | 7/2008 | Ohno et al. |
| 2009/0167910 A1 | 7/2009 | Carriere |
| 2011/0234876 A1 | 9/2011 | Leconte |

FOREIGN PATENT DOCUMENTS

| EP | 2071628 A1 | 6/2009 |
| WO | 2010066850 A1 | 6/2010 |

OTHER PUBLICATIONS

French Search Report for FR1152414, dated Oct. 13, 2011.

* cited by examiner

*Primary Examiner* — Seung C Sohn
(74) *Attorney, Agent, or Firm* — Lowe Hauptman & Ham, LLP

(57) ABSTRACT

A image sensor includes active pixels for gathering images at very high and very low luminance level. Each pixel includes at least one photodiode, a charge storage node, an electron multiplication amplification structure, a unit for transferring electrons from the photodiode to the structure, a unit for transferring electrons from the amplification structure to the storage node after multiplication, a transistor for reinitializing the potential of the storage node. The pixels are read by a reading circuit which samples the potential of the charge storage node after reinitialization and after transfer of the electrons into the storage node and which provides a corresponding illumination measurement. The sensor furthermore includes a unit for carrying out the integration of charge in two different durations in the course of one and the same frame, and for giving the amplification structure multiplication factors different to the charge integrated in the course of these durations.

18 Claims, 5 Drawing Sheets

IMAGE SENSOR WITH VERY HIGH DYNAMIC RANGE

RELATED APPLICATIONS

The present application is based on, and claims priority from, French Application Number 1152414, filed Mar. 23, 2011, the disclosure of which is hereby incorporated by reference herein in its entirety.

FIELD OF THE INVENTION

The invention relates to image sensors, and more particularly sensors intended to gather images both at very low luminance level and at very high luminance level.

BACKGROUND OF THE INVENTION

Most solid-state electronic sensors operate well for a mean luminance level. They can also operate at low luminance level, by greatly increasing the duration of integration, to the detriment of the rate of provision of images. Moreover, increasing the duration of integration may be incompatible with the application. For example a surveillance camera must typically provide 30 images per second, thus limiting the duration of integration. These sensors can also operate when the luminance level increases but beyond a certain luminance they saturate.

Certain sensors have been specially designed to operate at low luminance level. But they are very rapidly saturated even for a mean luminance when some points of the scene are brighter. These sensors include amongst them electron multiplication sensors.

Other sensors have been designed to operate at high luminance level, with complex systems making it possible to establish a light-dependent logarithmic (or at least with two slopes) response curve. These sensors cannot operate well at low luminance level.

A need exists for sensors with very high upward and downward dynamic range, that is to say sensors capable of operating both at very high luminance level and at very low luminance level, even within one and the same greatly contrasted image.

SUMMARY OF THE INVENTION

The invention proposes a sensor with active pixels, each pixel comprising at least one photodiode, a charge storage node, an electron multiplication amplification structure, means for transferring electrons from the photodiode to the amplification structure, means for transferring the electrons from the amplification structure to the storage node after multiplication, a transistor for reinitializing the potential of the storage node before transfer of the electrons into the storage node, the sensor furthermore comprising a reading circuit for sampling the potential of the charge storage node after reinitialization and after transfer of the electrons into the storage node and for providing a corresponding illumination measurement, the sensor furthermore comprising means for effecting in the course of an image frame a first transfer of charge from the photodiode to the multiplication structure after a first duration (Ti1) and for then giving the amplification structure a first electron multiplication factor (k1) before a first transfer of charge into the storage node, means for effecting in the course of the same image frame a second transfer of charge from the photodiode to the multiplication structure after a second duration (Ti2) and for then giving the structure a second electron multiplication factor different from the first (k2) before a second transfer of charge from the multiplication structure to the storage node, and means for selecting pixel by pixel an illumination measurement corresponding to the first factor or to the second factor as a function of the illumination of the pixel; in practice: as a function of a level of the potential of the storage node after a transfer of the electrons into the storage node.

In other words: the sensor observes an image scene by effecting for each image frame two successive transfers of charge corresponding to two integration times and corresponding to two different multiplication factors. If the measured quantity of electrons in respect of a pixel with one of the two multiplication factors culminates in a signal level which shows that the other factor would be more appropriate, this measurement is discarded for this pixel and the measurement performed with the other factor is retained.

It is possible to do the test with the measurement made with the higher multiplication factor; if the measured quantity of electrons is too high (indicating probable saturation of the pixel), this measurement is discarded and the measurement made with the smaller multiplication factor is used. But it is also possible to proceed by observing the level of potential for the lower multiplication factor; if the measured quantity of electrons is too low, this measurement is discarded because it is not significant and the measurement made with the higher factor is used.

The smaller multiplication factor is greater than or equal to 1, that is to say it can correspond to an absence or quasi-absence of multiplication but the electrons nevertheless travel across the amplification structure. The higher factor can range from 2 to 100, or even more in certain cases.

The numerical value of the illumination measurement made with the smaller multiplication factor is multiplied by the ratio of the two factors so that the measurements made with the two factors are referred to the same scale.

Preferably, not only are the multiplication factors different but, moreover, the integration times for the two measurements are different. Preferably again, the measurement performed with a lower multiplication factor is made with the shorter integration time, and the measurement performed with the higher multiplication factor is performed with the longer integration time.

The numerical value resulting from the illumination measurement made with the shorter time is multiplied by the ratio of the longer integration time to the shorter integration time.

The sensor preferably comprises
  means for performing a reinitialization of the potential of the storage node before the first transfer of charge from the amplification structure to the storage node, and a sampling of the potential of the storage node after this first transfer,
  means for performing a reinitialization of the potential of the storage node and a sampling of this potential in the reading circuit, before the second transfer of charge from the amplification structure to the storage node, and a sampling of the potential of the storage node after this second transfer,
  means for performing in the reading circuit an analogue-digital conversion of at least one difference between a sample taken after a transfer of electrons to the storage node and a sample taken between the reinitialization of the storage node and this transfer.

Two main possibilities of implementation of these three groups of operations may be envisaged. In a first possibility use is made of two sampling capacitors in a reading circuit situated upstream of an analogue-digital converter, one capacitor being reserved for a sampling of the storage node reinitialization level and another capacitor being reserved for a sampling of the level after transfer of electrons to the storage node. In this case the level resulting from the first transfer to the storage node is routinely sampled in the second capacitor; and then the level resulting from the second transfer is conditionally resampled in the second capacitor. The second multiplication factor is the higher; the second duration of integration is also preferably the longer. The condition is a condition of signal level of the storage node after a transfer, the aim being to perform the resampling only if there is no risk of saturation of the pixel. The test of the condition may be performed on the basis of the level of the potential of the storage node after the first transfer or after the second transfer to the storage node.

In another mode of operation, the reading circuit comprises three sampling capacitors; the first is again reserved for the sampling of the reinitialization level; the second serves for the sampling of the level after the first transfer; the third serves for the sampling after the second transfer. This mode of operation makes it possible to do true correlated double sampling.

In each pixel the electron multiplication amplification structure, inserted between a first transfer gate (for transferring from the photodiode to the multiplication structure) and a second transfer gate (for transferring from the amplification structure to the storage node), preferably comprises two separate acceleration gates situated between the first and the second transfer gate, and an intermediate diode region with fixed surface potential, situated between the two acceleration gates, and means for applying to the acceleration gates a succession of alternations of high and low potentials allowing successive transfers of charge from one acceleration gate to the other through the intermediate diode region.

The amplification coefficient is practically proportional to the number of alternations and it is therefore varied by modifying the number of alternations. If there are no or practically no alternations, the amplification factor is equal to 1.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DESCRIPTION OF PREFERRED EMBODIMENTS

Figure 1:
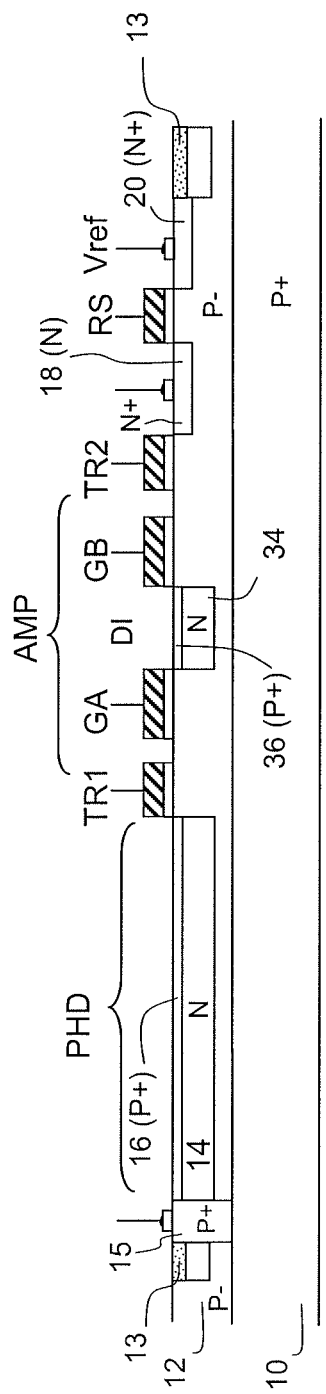
FIG. 1 represents in vertical section the general structure of an image sensor with active pixels with an amplification structure allowing multiplication of electrons within the pixel.

In FIG. 1 have been represented the main elements of an exemplary CMOS technology active pixel comprising an electron multiplication amplification structure within the pixel.

The pixel is formed in a substrate 10 which preferably comprises a lightly doped semiconducting active layer 12 of P type (the symbol P− is used to designate this weak doping) formed at the surface of a more heavily doped layer (P+). The pixel is insulated from the neighbouring pixels by an insulating barrier 13 which surrounds it completely. This barrier may be a surface insulating trench above a P-type well.

The pixel comprises a photodiode region PHD whose perimeter follows the contour of an N-type semiconducting region implanted in a part of the depth of the active layer 12. This implanted region is surmounted by a surface region 16 of P+ type, which is maintained at a zero reference potential. This is a so-called "pinned" photodiode (meaning that the surface potential of the P+ surface region is fixed). The zero reference potential is that which is applied to the P− active layer. In the simplest case, it is the potential of the substrate of P+ type situated under the active layer and applying its own potential to the active layer; the maintaining of the surface region 16 at this zero potential is achieved for example through the fact that the region 16 touches a deep diffusion 15 of P+ type which meets up with the substrate 10. An electrical contact can also be provided on this diffusion 15 so as to apply through this contact a zero potential to the region 16.

A charge storage region, or charge storage node, 18, is provided outside the photodiode region PHD; it is separated therefrom by a succession of two transfer gates TR1 and TR2 and an amplification structure AMP between the two transfer gates.

The charge storage node 18 is an N-type diffusion in the active layer 12. A contact is formed on this region, to make it possible to apply the potential of this region to the gate of a follower transistor (not represented), so as to transform the quantity of charge contained in the storage node into electrical voltage level.

Another gate RS, called the reinitialization gate, makes it possible to empty the charge from the storage node into an evacuation drain 20 which is a region of N+ type linked to a positive reinitialization potential Vref.

For simplicity, elements which may conventionally be present in the pixel have not been represented, notably a follower transistor for copying the potential of the storage node 18, and a row selection transistor, in the case of a matrix of several rows of pixels, so as to permit the connection of the source of the follower transistor to a column conductor of the matrix. These elements are in any event situated outside the insulation region 13 which surrounds the assembly of the photodiode and amplification structure. No gate for reinitializing the potential of the photodiode PHD is represented in the section of FIG. 1 either. This gate makes it possible to dump the charge of the photodiode into a drain (not represented) at the start of a duration of integration.

The first transfer gate TR1 enables the transfer of electrons from the photodiode to the amplification structure at the end of a duration of integration. The second transfer gate TR2 enables the transfer of electrons from the amplification structure to the storage node 18 at the end of an amplification phase.

In this example, the amplification structure comprises two acceleration gates GA and GB separated by a gap. This gap is occupied by an intermediate diode region DI, and this region constitutes a so-called "pinned" diode, like the photodiode. Like the photodiode (but not necessarily with the same dopings) it therefore consists of a diffused region 34 of N type in the active layer 12, this region being overlapped by a surface region 36 of P+ type. This region 36 is maintained at the zero reference potential for example through the fact that it touches, this not being visible in the figures, a deep region of P+ type meeting up with the substrate, analogous to the region 15 which touches the photodiode.

Potential switching means are designed to apply high or low potentials directly to the acceleration gates GA and GB according to the transfer or amplification phase concerned. At the end of an integration period, the electrons are transferred from the photodiode to the amplification structure; they are stored under the gate GA. During the amplification phase, an alternation of high and low potentials is applied in phase opposition to the gates GA and GB. The electrons are alternately accelerated from the gate GA towards the gate GB and vice versa. The voltages applied to the gates are sufficient to create an ionization by impact: the accelerated electrons tear away other electrons, multiplying the number of electrons by a coefficient slightly greater than 1 which depends on the voltages applied. This coefficient is multiplied by the number of alternations of potentials. The number of alternations may be several hundred or several thousand. The overall amplification coefficient therefore depends on the voltages applied and on the number of alternations. The switching means are not represented since they are not situated in the pixel. They are common to the pixels of a row or of a column or to all the pixels of the matrix. At the end of the amplification phase, the electrons are stored under the gate GB; from there they are transferred to the storage node 18 through the gate TR2.

According to the invention, provision is made for the amplification structure to be able to operate with at least two amplification coefficients, that is to say in practice with at least two different numbers of alternations, the voltages applied to the gates being in practice constant and chosen on account of technological imperatives which are as follows: fairly high voltage so as to increase even slightly the number of electrons at each alternation, voltage not too high so as not to degrade the insulating oxides placed under the gates GA and GB. The first amplification coefficient may be equal to 1, that is to say there are no or practically no alternations of the opposite potentials on the gates GA and GB: the electrons arriving under the gate GA are thereafter transferred just once to the gate GB and depart from there directly to the storage node. The second amplification coefficient is obtained with a number of alternations which may range from several tens to several hundreds or even several thousands.

Generally, the pixel forms part of a matrix of pixels in rows and column, the pixels of one and the same row are addressed by a row conductor, and the outputs of the pixels of one and the same column are linked to a column conductor. A reading circuit based on double sampling is placed at the foot of a column and makes it possible to sample the potentials which appear on the column conductor when selecting a row of pixels. The potential appearing on the column conductor corresponds to the potential of the storage node, which may be a reinitialization potential or a useful signal potential corresponding to the illumination of the selected pixel. The reading circuit samples a reinitialization potential and a useful potential and retains them in memory; it determines the difference and converts it into digital.

The manner of operation of the pixel in a sensor according to the invention is explained with reference to FIG. 2 for an image frame FR consisting of an integration of charge followed by a reading of the pixels row by row. Only the signals corresponding to a row are represented so as not to overload the figure.

Reading proceeds in the following manner, explained with reference to the timechart of FIG. 2.

The signal GR represents a reinitialization of the potential of the photodiode for a row of pixels, carried out for example by opening the above-mentioned photodiode reinitialization gate.

The signal RS represents a pulse for reinitializing the potential of the storage node. It is emitted successively for each row at the moment of reading.

The sampling signals at the foot of a column are designated by SHR (sampling of a reinitialization level of the storage node) and SHS (sampling of a useful level of the storage node after dumping into this node of the charge amplified by the amplification structure). These signals are emitted successively row by row in the course of reading.

The lines TR1 and TR2 represent the pulses applied respectively to the gates TR1 and TR2.

The lines GA and GB represent the durations over which multiple alternations of high and low potentials are applied to the gates GA and GB of the amplification structure. These potentials are applied to all the pixels of the matrix for which amplification is desired (for example all the pixels of the matrix or all the pixels of a region of interest).

The sequence for the frame FR proceeds as follows:

reinitialization of the photodiode by the signal GR, the end of this reinitialization constituting the start of an integration period; the end of the signal GR determines the start of a first duration of charge integration Ti1;

integration of charge in the photodiode opening of the first transfer gate TR1, transferring the charge of the photodiode under the gate GA of the amplification structure at the end of the duration of integration Ti1; it is the end of the opening of the gate TR1 which determines the end of the duration Ti1; the first duration of integration is preferably brief, that is to say less or much less than half the total duration of the frame; the photodiode recommences charge integration as soon as the gate recloses and this integration lasts for a second duration of integration Ti2 first amplification with a first amplification coefficient k1 which is low or even unity (no amplification) of the charge now situated in the amplification structure, by applying an alternation of potentials to the gates GA and GB; the number of alternations is chosen so as to multiply the number of electrons by a first multiplication coefficient k1.

reinitialization of the potential of the storage node by a signal RS;

brief opening of the second transfer gate TR2 so as to transfer the charge amplified by the coefficient k1 to the storage node; reclosing of this gate;

opening of the first transfer gate TR1, defining the end of a second duration of integration Ti2, the sum of the durations Ti1 and Ti2 constituting the total duration of integration of the frame; the charge corresponding to the second duration passes into the amplification structure and will be amplified with a second amplification coefficient k2 different from the first;

at the end of the second amplification and before the transfer of the amplified charge to the storage node by the gate TR2, the following is done in this order: a first sampling, by the signal shs1, in the reading circuit, of the level of the storage node which, at this moment, corresponds to the first integration, amplified by the coefficient k1; then a reinitialization of the storage node (RS); then a second sampling, in the reading circuit, of the reinitialization level (shr);

finally, opening of the second transfer gate TR2, therefore a second transfer to the storage node of the charge of the second duration of integration, amplified by the second amplification coefficient; finally a third sampling, but conditional and non-routine, shs2 of the level of the storage node; the third sampling, if it is done, replaces the first sampling.

The third sampling is not performed if the illumination measured by the pixel, either subsequent to the first duration of integration or subsequent to the second duration of integration, exceeds a threshold showing a risk of saturation of the measurement chain.

If the third sampling is not performed, the difference between the first sample and the second sample is then digitized. This amounts to keeping the result of the first integration only.

In the converse case, if the third sampling is performed (no risk of saturation), the third sample substitutes for the first. The difference between the third and the second sample is then digitized, this amounting to measuring the result of the integration for the second duration only. This difference is a measurement by true correlated double sampling, in contradistinction to the digitization of the difference between the first two samples.

The numerical value obtained in the first case (no third sampling) is multiplied by a factor which is the ratio (k2·Ti2/k1·Ti1) so as to be referenced with respect to the same scale as in the second case (with third sampling).

To perform a third conditional sampling, it is possible to test the level of potential of the storage node at the end of the second measurement, at an instant $t_{comp}$ just before the moment of the third conditional sampling, or to test the level of potential of the storage node at the end of the first measurement.

The reading circuit comprises a test circuit for this purpose which acts so as to optionally permit the production of the signal shs2. This circuit stores moreover the result of the test and this result is used to decide whether or not it is necessary to multiply the result of the differential measurement by a multiplicative factor (k2·Ti2/k1·Ti1).

Figure 3:
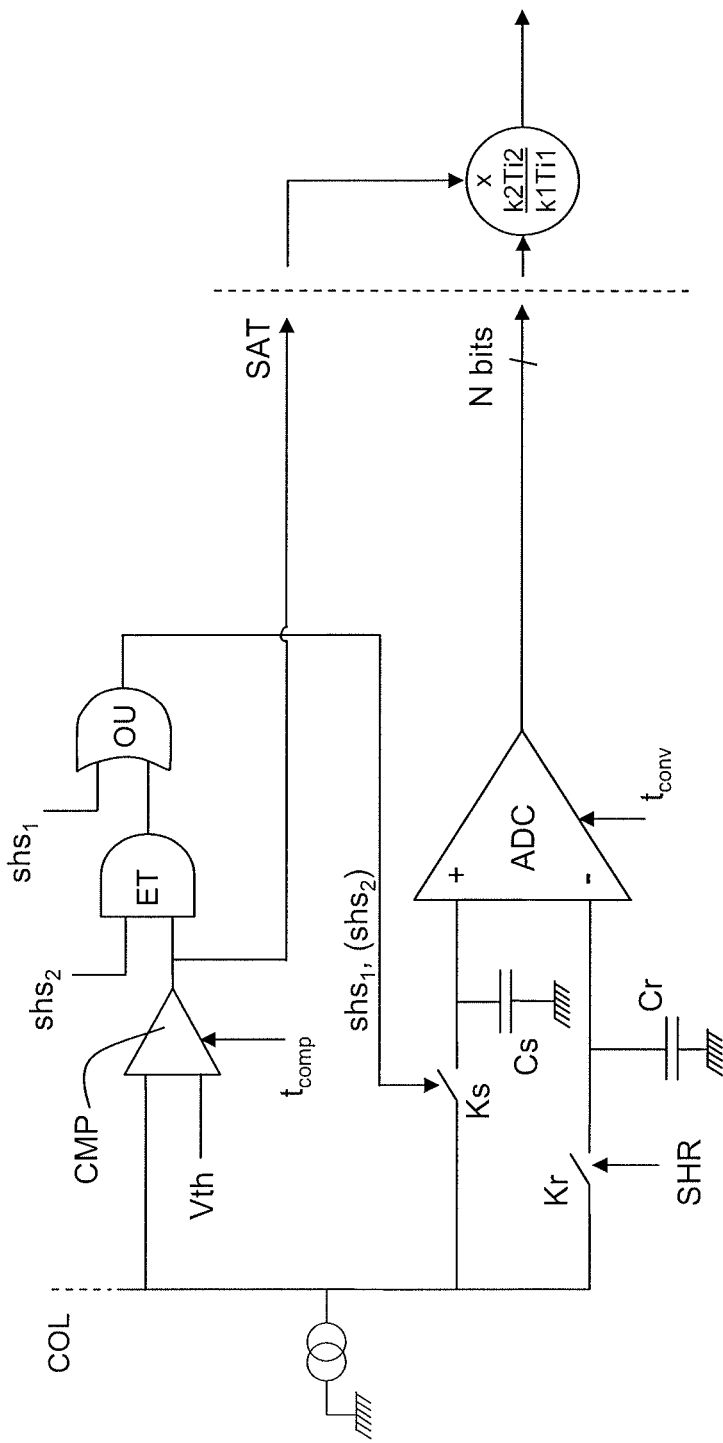
FIG. 3 represents a reading circuit which makes it possible to gather the image according to the timechart of FIG. 2.

The reading circuit, at the foot of a column, of FIG. 3 corresponds to a test done just before the third sampling at an instant $t_{comp}$ after the second opening of the gate TR2 therefore on the signal resulting from the second duration of integration. The circuit comprises a threshold-type comparator CMP. The first and the third sampling are done in a capacitor Cs; the second is done in a capacitor Cr. An analogue-digital converter ADC converts the difference between the samples of potential stored in the two capacitors and provides a measurement result. The result of the comparison (signal SAT) does not influence the passage of the signal shs1; but it prohibits the passage of the signal shs2 if the result shows that the illumination over the second duration of integration exceeds a threshold. The result SAT of the comparison is transmitted with the information of the analogue-digital conversion so as to make it possible, in the case of omission of the sampling shs2, to do the multiplication by (k2·Ti2/k1·Ti1).

Rather than test the level attained subsequent to the second integration, it is possible to envisage also testing the level attained subsequent to the first integration, therefore at the moment at which the first sample is stored under the control of the signal shs1. In particular, if a ramp-type analogue-digital converter is used, it is possible to instigate a first conversion ramp immediately upon the end of the signal shr so as to perform a provisional conversion which will be followed by a definitive conversion. At this moment, the difference between the first sample and the second is available at the terminals of the converter. The difference between these samples is small since both the duration of integration Ti1 and the amplification coefficient k1 are small, so that the converter will very rapidly give information about the measurement. The level attained at the output of the converter after the short provisional ramp is used to optionally trigger the third conditional sampling. The provisional conversion can consist in observing the output of an input comparator of the converter; the comparator receives on its two inputs the samples of useful signal and of reinitialization level; a short linear voltage ramp of predefined duration is applied to the useful signal input and is added to the useful signal; the comparator toggles as soon as the differential voltage between its inputs becomes zero. The comparator toggles before the end of the ramp if the illumination is low, it does not toggle if the illumination is high. If there is too much light, the signal shs2 will not be triggered and the definitive conversion of the difference between the first and second samples will be begun. If conversely there is little light, the third sampling will be triggered and the definitive conversion of the difference between the first and third samples will be done.

Figure 2:
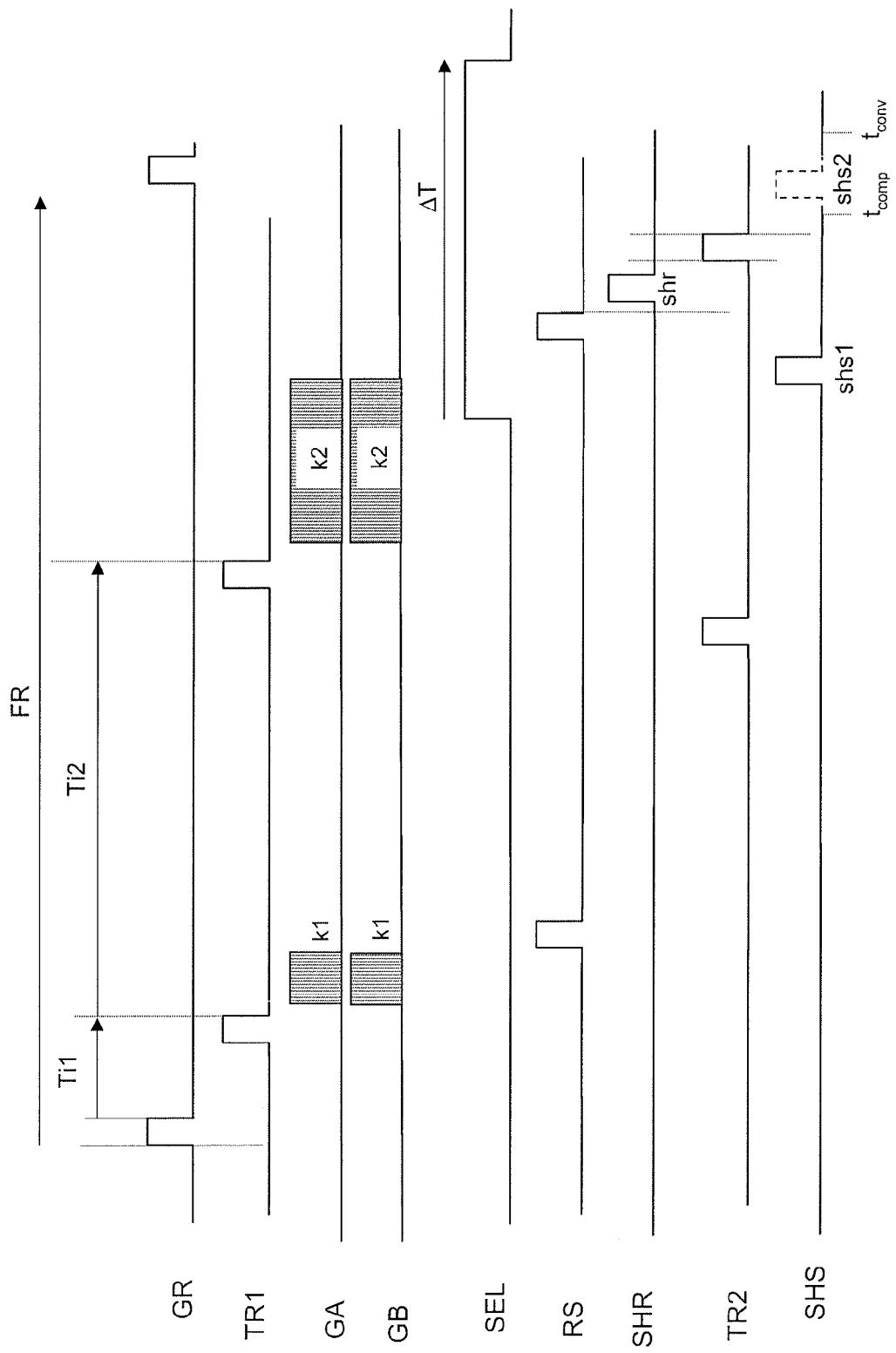
FIG. 2 represents an operating timechart in the case where an image is gathered in the course of a frame decomposed into two different successive integration times.

Finally, to conclude the explanation of FIG. 2, it is recalled that the integration is done with a time shift between each row. The value of the shift is the time ΔT required to perform the three samplings and to perform the analogue-digital conversion of the differences of samples. This duration ΔT is represented here by the duration of a signal SEL which controls the selection of a row of pixels. This selection acts on the row so as to carry over on a column conductor, to the reading circuit at the foot of a column, the successive levels of potential of the storage node. It will be noted that the signal SEL may be shorter than the duration ΔT but it absolutely must cover at least the three sampling instants shr, shs1 and shs2 (not necessarily the whole of the duration of the conversion).

Consequently all the signals represented in FIG. 2 for a row must be repeated identically but shifted by at least ΔT for the following row and so on and so forth (so-called "rolling shutter" operation).

Figure 4:
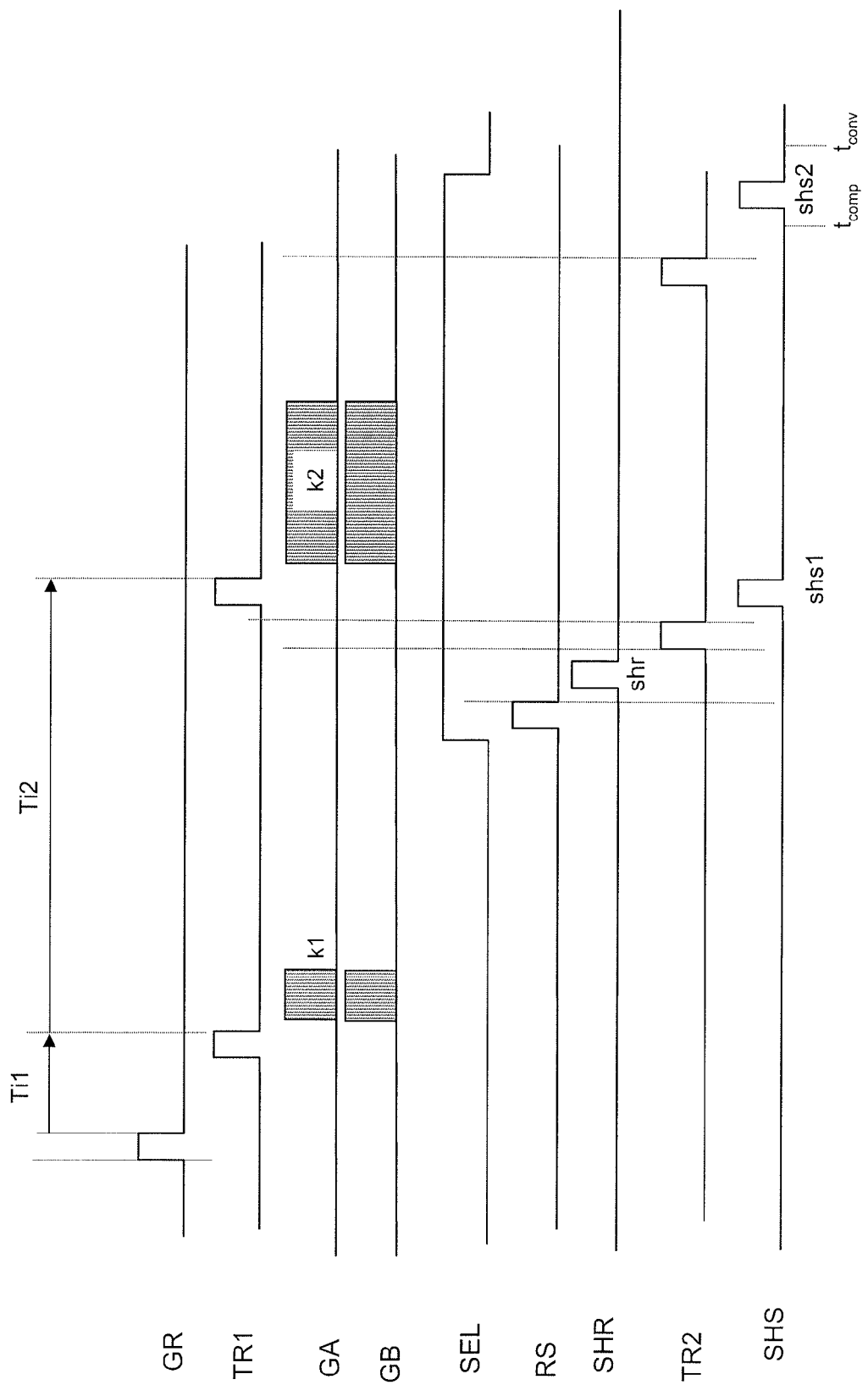
FIG. 4 represents a timechart variant with two different integration times and correlated double sampling for the two integration times.
Figure 5:
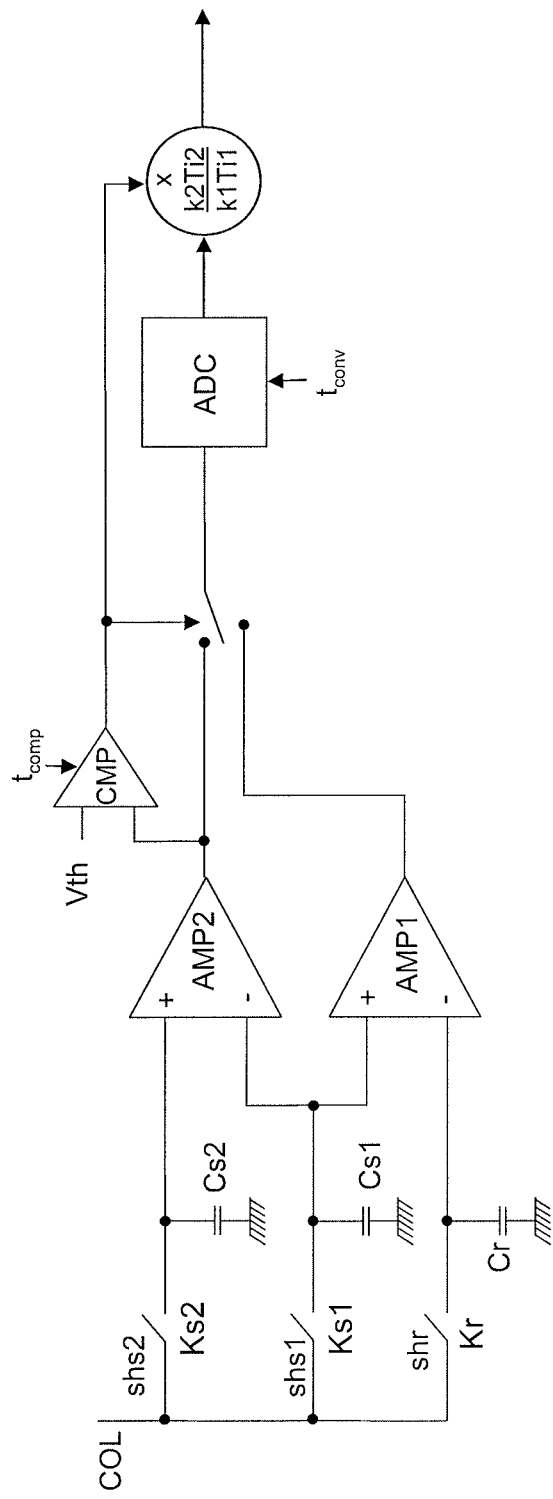
FIG. 5 represents a reading circuit operating according to the timechart of FIG. 4.

To be able to do true correlated double sampling both in the case of strong illuminations and in the case of weak illuminations, a device with three sampling capacitors can be used at the foot of a column, and the timechart of FIG. 2 is slightly modified, so as to arrive at that of FIG. 4. The reading circuit which allows this manner of operation is represented in FIG. 5.

The timechart is identical to that of FIG. 2 for the reinitialization of a row of photodiodes by the signal GR, for the transfer pulses by the gates TR1 at the end of the two durations of integration, and for the amplification of the charge by coefficients k1 and k2 subsequent to these transfers.

For the reading of the row, the following is now undertaken, the signal SEL serving to select the row to which the sampling pulses are applied:

reinitialization by the signal RS of the potential of the storage node;

sampling of this potential by the reading circuit (signal shr) in a first sampling capacitor Cr;

transfer to the storage node, by the gate TR2, of the charge integrated over the first duration Ti1 and amplified with the first coefficient k1; after this first transfer by the gate TR2, a second transfer is done by the gate TR1, as in FIG. 2, so as to put the charge arising from the second duration of integration into the amplification structure;

second sampling shs1 in a second capacitor Cs1 (FIG. 5);

then, at the end of a time reserved for the amplification with a coefficient k2, the second transfer to the storage node by the gate TR2 is performed; the charge integrated over the duration Ti2 and amplified with the coefficient k2 passes into the storage node where it is added to the previous charge;

third sampling shs2 (which this time is not optional but routine); this third sampling stores the new level of potential in a third capacitor Cs2.

FIG. 5 represents the corresponding reading circuit, at the foot of a column. A first differential amplifier AMP1 measures the difference between the levels of the first and of the second capacitor; this difference represents the measurement of the charge integrated over the first duration Ti1 and amplified by the coefficient k1. It is a measurement by true correlated double sampling since the storage node has been reset to zero before the dumping.

A second differential amplifier AMP2 measures the difference between the levels stored in the third and the second capacitors; this difference represents the extra charge due to the second duration of integration Ti2 alone, amplified by the coefficient k2.

The output of the second amplifier is applied to a threshold-type comparator which detects a risk of saturation if the threshold is exceeded.

If the threshold is exceeded, that is to say if the illumination is strong, the output of the first amplifier is routed towards the analogue-digital converter, and the result of the conversion will then be multiplied by the ratio (k2·Ti2/k1·Ti1) so as to be defined according to the same scale as for the dark points.

If the threshold is not exceeded, that is to say if the illumination is sufficiently weak, the output of the second amplifier is routed towards the analogue-digital converter.

Here again, the detection of a threshold could be performed on the first measurement, for example by doing a routine provisional fast analogue-digital conversion of the output of the amplifier AMP1, by optionally switching over to the amplifier AMP2 as a function of the result of the conversion, and by doing the definitive conversion thereafter. This provisional conversion may be reduced to a very simple test if the converter is a ramp-type converter to which is applied a provisional ramp of fixed (brief) duration defining an illumination threshold.

Finally, in one embodiment, provision may be made for the multiplication structure to operate by applying opposite potentials to two gates (this is the case in what was described hereinabove). It is then possible to control the first gate (GA) by row conductors linking the pixels of one and the same row and the second gate (GB) by column conductors linking the pixels of one and the same column. Amplification by alternation of potentials occurs only if at one and the same time the gates GA and the gates GB receive opposite potentials in periodic alternation. Provision may be made for means for selecting a part only of the rows of pixels to apply an alternation of potentials to their gates GA and for means for selecting a part only of the columns of pixels to apply an alternation of potentials to their gates GB, in phase opposition with that of the rows. In this case, only the pixels at the intersections of these rows and columns will undergo amplification by multiplication of electrons in the pixel. It is therefore possible to select a region of interest in the image, notably a dark region, in order to apply to it an amplification by multiplication of electrons with two coefficients without applying it to the other regions.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An image sensor with active pixels, each pixel comprising at least one photodiode, a charge storage node, an electron multiplication amplification structure, means for transferring electrons from the photodiode to the amplification structure, means for transferring electrons from the amplification structure to the storage node after multiplication, a transistor for reinitializing the potential of the storage node, the sensor furthermore comprising a reading circuit for sampling the potential of the charge storage node after reinitialization and after transfer of the electrons into the storage node and for providing a corresponding illumination measurement, the sensor furthermore comprising means for effecting in the course of an image frame a first transfer of charge from the photodiode to the multiplication structure after a first duration and for then giving the amplification structure a first electron multiplication factor before a first transfer of charge from the multiplication structure into the storage node, means for effecting in the course of the same image frame a second transfer of charge from the photodiode to the multiplication structure after a second duration and for then giving the structure a second electron multiplication factor (k2) different from the first before a second transfer of charge from the amplification structure to the storage node, and means for selecting pixel by pixel an illumination measurement corresponding to the first factor or to the second factor as a function of the illumination of the pixel.

2. An image sensor according to claim 1, wherein the illumination measurements made with the two different multiplication factors are made with two different integration times and the illumination measurement made with the smaller amplification factor is made with the smaller integration time.

3. An image sensor according to claim 1, comprising means for performing a reinitialization of the potential of the storage node in the reading circuit before the first transfer of charge from the amplification structure to the storage node, and a sampling of the potential of the storage node after this first transfer, means for performing a reinitialization of the potential of the storage node and a sampling of this potential in the reading circuit, before the second transfer of charge from the amplification structure to the storage node, and a sampling of the potential of the storage node after this second transfer, means for performing in the reading circuit an analogue-digital conversion of at least one difference between a sample taken after a transfer of electrons to the storage node and a sample taken between the reinitialization of the storage node and this transfer.

4. An image sensor according to claim 2, comprising means for performing a reinitialization of the potential of the storage node in the reading circuit before the first transfer of charge from the amplification structure to the storage node, and a sampling of the potential of the storage node after this first transfer, means for performing a reinitialization of the potential of the storage node and a sampling of this potential in the reading circuit, before the second transfer of charge from the amplification structure to the storage node, and a sampling of the potential of the storage node after this second transfer, means for performing in the reading circuit an analogue-digital conversion of at least one difference between a sample taken after a transfer of electrons to the storage node and a sample taken between the reinitialization of the storage node and this transfer.

5. An image sensor according to claim 1, wherein the reading circuit comprises two sampling capacitors, one capacitor being reserved for a sampling of the storage node reinitialization level and another capacitor being reserved for a sampling of the level after a transfer of electrons to the storage node, the sensor comprising means for sampling routinely in the second capacitor the level resulting from the first transfer to the storage node, and means for sampling conditionally in the second capacitor the level resulting from the second transfer to the storage node, the condition being a condition of signal level of the storage node after a transfer.

6. An image sensor according to claim 2, wherein the reading circuit comprises two sampling capacitors, one capacitor being reserved for a sampling of the storage node reinitialization level and another capacitor being reserved for a sampling of the level after a transfer of electrons to the storage node, the sensor comprising means for sampling routinely in the second capacitor the level resulting from the first transfer to the storage node, and means for sampling conditionally in the second capacitor the level resulting from the second transfer to the storage node, the condition being a condition of signal level of the storage node after a transfer.

7. An image sensor according to claim 3, wherein the reading circuit comprises two sampling capacitors, one capacitor being reserved for a sampling of the storage node reinitialization level and another capacitor being reserved for a sampling of the level after a transfer of electrons to the storage node, the sensor comprising means for sampling routinely in the second capacitor the level resulting from the first transfer to the storage node, and means for sampling conditionally in the second capacitor the level resulting from the second transfer to the storage node, the condition being a condition of signal level of the storage node after a transfer.

8. An image sensor according to claim 4, wherein the reading circuit comprises two sampling capacitors, one capacitor being reserved for a sampling of the storage node reinitialization level and another capacitor being reserved for a sampling of the level after a transfer of electrons to the storage node, the sensor comprising means for sampling routinely in the second capacitor the level resulting from the first transfer to the storage node, and means for sampling conditionally in the second capacitor the level resulting from the second transfer to the storage node, the condition being a condition of signal level of the storage node after a transfer.

9. An image sensor according to claim 1, wherein the reading circuit comprises three sampling capacitors, and the sensor furthermore comprises means for performing a reinitialization of the potential of the storage node in the reading circuit before the first transfer of charge from the amplification structure to the storage node, and a sampling of the potential of the storage node in the first capacitor after this first transfer, and means for sampling the potential of the storage node in the second capacitor after the first transfer to the storage node and for sampling the potential of the storage node in the third capacitor after the second transfer to the storage node, without reinitialization of the storage node between the first and the second transfers to the storage node.

10. An image sensor according to claim 2, wherein the reading circuit comprises three sampling capacitors, and the sensor furthermore comprises means for performing a reinitialization of the potential of the storage node in the reading circuit before the first transfer of charge from the amplification structure to the storage node, and a sampling of the potential of the storage node in the first capacitor after this first transfer, and means for sampling the potential of the storage node in the second capacitor after the first transfer to the storage node and for sampling the potential of the storage node in the third capacitor after the second transfer to the storage node, without reinitialization of the storage node between the first and the second transfers to the storage node.

11. An image sensor according to claim 1, wherein the amplification structure comprises, inserted between a first transfer gate for transferring from the photodiode to the amplification structure and a second transfer gate for transferring from the amplification structure to the storage node, two acceleration gates situated between the first and the second transfer gate, and an intermediate diode region with fixed surface potential, situated between the two acceleration gates, and means for applying to the acceleration gates a succession of alternations of high and low potentials allowing successive transfers of charge from one acceleration gate to the other through the intermediate diode region.

12. An image sensor according to claim 2, wherein the amplification structure comprises, inserted between a first transfer gate for transferring from the photodiode to the amplification structure and a second transfer gate for transferring from the amplification structure to the storage node, two acceleration gates situated between the first and the second transfer gate, and an intermediate diode region with fixed surface potential, situated between the two acceleration gates, and means for applying to the acceleration gates a succession of alternations of high and low potentials allowing successive transfers of charge from one acceleration gate to the other through the intermediate diode region.

13. An image sensor according to claim 3, wherein the amplification structure comprises, inserted between a first transfer gate for transferring from the photodiode to the amplification structure and a second transfer gate for transferring from the amplification structure to the storage node, two acceleration gates situated between the first and the second transfer gate, and an intermediate diode region with fixed surface potential, situated between the two acceleration gates, and means for applying to the acceleration gates a succession of alternations of high and low potentials allowing successive transfers of charge from one acceleration gate to the other through the intermediate diode region.

14. An image sensor according to claim 1, wherein the amplification by two electron multiplication factors is performed selectively in a region of interest of the sensor.

15. An image sensor according to claim 2, wherein the amplification by two electron multiplication factors is performed selectively in a region of interest of the sensor.

16. An image sensor according to claim 3, wherein the amplification by two electron multiplication factors is performed selectively in a region of interest of the sensor.

17. An image sensor according to claim 5, wherein the amplification by two electron multiplication factors is performed selectively in a region of interest of the sensor.

18. An image sensor according to claim 9, wherein the amplification by two electron multiplication factors is performed selectively in a region of interest of the sensor.

* * * * *